(12) United States Patent
Sharma et al.

(10) Patent No.: US 12,055,632 B2
(45) Date of Patent: Aug. 6, 2024

(54) LIDAR BASED STEREO CAMERA CORRECTION

(71) Applicant: Waymo, LLC, Mountain View, CA (US)

(72) Inventors: Shashank Sharma, Mountain View, CA (US); Matthew Last, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 968 days.

(21) Appl. No.: 17/069,364

(22) Filed: Oct. 13, 2020

(65) Prior Publication Data

US 2022/0113419 A1 Apr. 14, 2022

(51) Int. Cl.
*G01S 17/89* (2020.01)
*B60R 1/12* (2006.01)
*G01S 17/48* (2006.01)
*G06T 7/80* (2017.01)

(52) U.S. Cl.
CPC ............... *G01S 17/89* (2013.01); *B60R 1/12* (2013.01); *G01S 17/48* (2013.01); *G06T 7/85* (2017.01); *B60R 2001/1223* (2013.01)

(58) Field of Classification Search
None
See application file for complete search history.

(56) References Cited

U.S. PATENT DOCUMENTS

| 7,012,560 B2 | 3/2006 | Braeuchle et al. |
| 8,139,109 B2 | 3/2012 | Schmiedel et al. |
| 8,509,519 B2 | 8/2013 | Wang |
| 8,760,501 B2 * | 6/2014 | Oohchida ............ G02B 5/3041 348/47 |

(Continued)

FOREIGN PATENT DOCUMENTS

| KR | 10-2019-0107283 A | 9/2019 |
| WO | 2013039273 A1 | 3/2013 |

OTHER PUBLICATIONS

Math_Review_-_Review_Topics_-_Ratios.pdf (nyu.edu) and wayback machine (Year: 2013).*

(Continued)

*Primary Examiner* — Yuqing Xiao
*Assistant Examiner* — Jempson Noel
(74) *Attorney, Agent, or Firm* — McDonnell Boehnen Hulbert & Berghoff LLP (57) ABSTRACT

One example system comprises an active sensor that includes a transmitter and a receiver, a first camera that detects external light originating from one or more external light sources to generate first image data, a second camera that detects external light originating from one or more external light sources to generate second image data, and a controller. The controller is configured to perform operations comprising determining a first distance estimate to a first object based on a comparison of the first image data and the second image data, determining a second distance estimate to the first object based on active sensor data, com- (Continued)

paring the first distance estimate and the second distance estimate, and determining a third distance estimate to a second object based on the first image data, the second image data, and the comparison of the first and second distance estimates.

20 Claims, 6 Drawing Sheets

(56) References Cited

U.S. PATENT DOCUMENTS

| | | |
|---|---|---|
| 9,135,710 B2 | 9/2015 | Cohen et al. |
| 9,229,096 B2 | 1/2016 | Kim et al. |
| 9,575,164 B2 | 2/2017 | Kim |
| 9,756,312 B2 | 9/2017 | Akin et al. |
| 9,877,009 B2 | 1/2018 | Tran et al. |
| 10,127,463 B2 | 11/2018 | Fursich |
| 2010/0204964 A1 | 8/2010 | Pack et al. |
| 2011/0043679 A1 | 2/2011 | Lee et al. |
| 2013/0342657 A1* | 12/2013 | Robertson ............ H04N 13/239 348/47 |
| 2016/0349371 A1* | 12/2016 | Suzuki .................... G01S 17/10 |
| 2017/0200284 A1* | 7/2017 | Lee ......................... G06T 7/593 |
| 2017/0350968 A1* | 12/2017 | Lane ....................... G01S 17/86 |
| 2018/0267142 A1* | 9/2018 | Motoyama ............ G01S 7/4026 |
| 2019/0033459 A1* | 1/2019 | Tisdale .................... G01S 7/497 |
| 2019/0098233 A1 | 3/2019 | Gassend et al. |
| 2019/0383932 A1 | 12/2019 | Flores Tapia et al. |
| 2019/0391244 A1 | 12/2019 | Sekiguchi et al. |
| 2020/0108774 A1 | 4/2020 | Hashimoto et al. |
| 2020/0150695 A1 | 5/2020 | Huang et al. |
| 2020/0211219 A1 | 7/2020 | Yamazaki et al. |
| 2021/0406618 A1 | 12/2021 | Park et al. |

OTHER PUBLICATIONS

International Search Report and Written Opinion for PCT/US2021/053361 mailed on Jan. 26, 2022.

Joshua Veitch-Michaelis, "Fusion of LIDAR with stereo camera data—an assessment", Doctoral Thesis, University College London, 2017.

Kumar et al., "LiDAR and Camera Fusion Approach for Object Distance Estimation in Self-Driving Vehicles", Symmetry, 12(2), Feb. 24, 2020.

* cited by examiner

LIDAR BASED STEREO CAMERA CORRECTION

BACKGROUND

Active sensors, such as light detection and ranging (LIDAR) sensors, radio detection and ranging (RADAR) sensors, and sound navigation and ranging (SONAR) sensors, among others, can scan an environment by emitting signals toward the environment and detecting reflections of the emitted signals. Passive sensors, such as image sensors and microphones among others, can detect signals originating from sources in the environment.

An example LIDAR sensor can determine distances to environmental features while scanning through a scene to assemble a "point cloud" indicative of reflective surfaces. Individual points in the point cloud can be determined, for example, by transmitting a laser pulse and detecting a returning pulse, if any, reflected from an object in the environment, and then determining a distance to the object according to a time delay between the transmission of the pulse and the reception of its reflection. Thus, a three-dimensional map of points indicative of locations of reflective features in the environment can be generated.

An example image sensor can capture an image of a scene viewable to the image sensor. For instance, the image sensor may include an array of complementary metal oxide semiconductor (CMOS) active pixel sensors, or other types of light sensors. Each CMOS sensor may receive a portion of light from the scene incident on the array. Each CMOS sensor may then output a measure of the amount of light incident on the CMOS sensor during an exposure time when the CMOS sensor is exposed to the light from the scene. With this arrangement, an image of the scene can be generated, where each pixel in the image indicates one or more values (e.g., colors, etc.) based on outputs from the array of CMOS sensors.

A stereo image sensor system includes multiple image sensors which can simultaneously capture multiple images, one with each image sensor component. The stereo image sensor system can then combine these images to create or simulate a three-dimensional (3D), stereoscopic image.

SUMMARY

In one example, a system includes a light detection and ranging (LIDAR) sensor that includes a transmitter and a receiver. The transmitter emits light pulses toward an environment of the LIDAR sensor. The receiver detects reflections of the emitted light pulses. The LIDAR sensor scans the environment based on rotation of the LIDAR sensor about an axis. The system also includes two or more cameras that detect external light originating from one or more external light sources. The two or more cameras together form a stereo camera system usable to estimate distances to objects identified in the images captured thereby. The system also includes a controller that operates the stereo camera system to obtain a sequence of images and estimate the distance to a plurality of objects therein. The controller further uses data from the LIDAR sensor to estimate the distance to one or more of the plurality of objects and compare the distance estimate formed from the stereo camera data to the distance estimate formed from the LIDAR data. The controller uses the comparison to adjust additional distance estimates to objects based on the stereo camera data.

In another example, a device includes an active distance sensor that emits a signal, such as light or sound, towards a field-of-view (FOV) defined by a pointing direction of the sensor, and detects reflections of the emitted signal. The device also includes a stereo image sensor system that detects external light originating from one or more external light sources. The device estimates a distance to one or more first objects in the FOV based on data from the active distance sensor. The device separately estimates a distance to the one or more first objects in the FOV based on data from the stereo image sensor system. The device calculates a correction factor by comparing the distance estimates based on the active distance sensor data and the distance estimates based on the stereo camera system data. The device then estimates a distance to one or more second objects based on data from the stereo camera system and the correction factor.

In yet another example, a system comprises a light detection and ranging (LIDAR) sensor that includes a transmitter and a receiver, wherein the transmitter emits light pulses toward an environment of the LIDAR sensor, wherein the receiver detects reflections of the emitted light pulses. The system further comprises a first camera that detects external light originating from one or more external light sources to generate first image data and a second camera that detects external light originating from one or more external light sources to generate second image data. A controller is configured to perform operations comprising determining a first distance estimate to a first object based on a comparison of the first image data and the second image data, determining a second distance estimate to the first object based on LIDAR sensor data, comparing the first distance estimate and the second distance estimate, and determining a third distance estimate to a second object based on the first image data, the second image data, and the comparison of the first and second distance estimates.

In still another example, a method involves rotating an active sensor about an axis to scan an environment of the active sensor. The active sensor emits a signal toward the environment and detects reflections of the emitted signal. The method also involves obtaining a plurality of images of the environment from two or more respective image sensors in a stereo image sensor system. The plurality of images are compared to estimate a distance to a first object. A distance to the first object is separately estimate based on data from the active sensor. The two distance estimates are compared to determine an error factor of the estimate based on the images. A distance to a second object is estimated based on the comparison of the plurality of images and the error factor.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

A vehicle, such as an autonomous vehicle, can utilize data from multiple sensors, such as a stereo image sensor system and an active sensor, to generate a representation of a scanned environment. The data from the multiple sensors can be used to identify objects within the scanned environment and estimate the distance between the vehicle and the identified objects.

Example devices, systems, and methods herein relate to comparing data from two or more sensors that sense a surrounding environment. One example device may include a rotating active sensor, such as a LIDAR sensor, and two or more cameras. The two or more cameras may together be used to estimate the distance to objects in the environment by comparing simultaneously captured images from the respective cameras. The active sensor can estimate the distance to objects in the environment by transmitting a signal, such as sound or light, into the environment and measuring the time between transmitting the signal and receiving the reflected signal.

With this arrangement for instance, the device can improve the accuracy of distance estimates by comparing the data from the stereo camera system to the data from the active sensor. In some circumstances, the active sensor can provide highly accurate distance estimates. For example, a LIDAR sensor can provide highly accurate distance estimates to an object within a certain range when the object has a reflective surface substantially normal or orthogonal to the pointing direction of the LIDAR sensor. Distance estimates based on active sensor data under these circumstances can be compared to distance estimates to the same objects based on the stereo camera system data to determine an error factor of the stereo camera system.

In other circumstances, the active sensor may not be able to reliably estimate distance to an object. For example, if the object is outside of the ideal range, outside of the active sensor's field-of-view, the object is not reflective, the object does not have a surface substantially normal to the pointing direction of the active sensor, and/or there is interference with the signal. In these circumstances, the distance to the object can be estimated based on data from the stereo camera system modified by the above determined error factor.

Although example systems described herein include LIDAR sensors and cameras (or image sensors), other types of sensors are possible as well. A non-exhaustive list of example sensors that can be alternatively employed herein without departing from the scope of the present disclosure includes RADAR sensors, SONAR sensors, sound sensors (e.g., microphones, etc.), motion sensors, temperature sensors, pressure sensors, etc.

To that end, example sensors herein may include active sensors that emit a signal (e.g., a sequence of pulses or any other modulated signal) based on modulated power provided to the sensor, and then detects reflections of the emitted signal from objects in the surrounding environment. Alternatively or additionally, example sensors herein may include passive sensors (e.g., cameras, microphones, antennas, pressure sensors, etc.) that detect external signals (e.g., background signals, etc.) originating from external source(s) in the environment.

Figure 1:
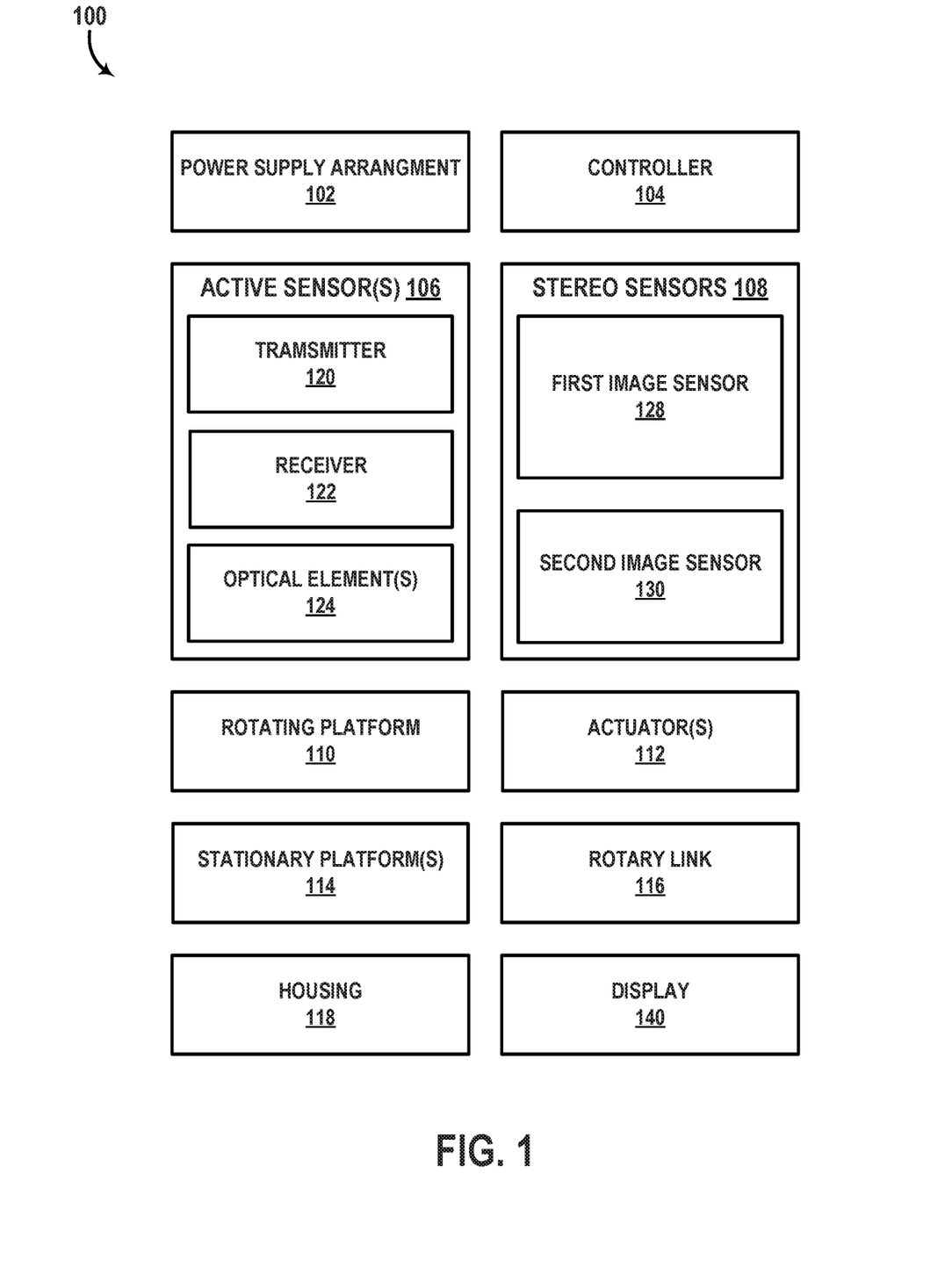
FIG. 1 is a simplified block diagram of a system, according to example embodiments.

Referring now to the figures, FIG. 1 is a simplified block diagram of a system 100 that includes synchronized sensors, according to an example embodiment. As shown, system 100 includes a power supply arrangement 102, a controller 104, one or more active sensors 106, one or more stereo sensors 108, a rotating platform 110, one or more actuators 112, a stationary platform 114, a rotary link 116, a housing 118, and a display 140.

In other embodiments, system 100 may include more, fewer, or different components. Additionally, the components shown may be combined or divided in any number of ways. For example, the stereo sensors 108 can be implemented as a single physical component (e.g., camera array). Alternatively, for example, sensors 108 can be implemented as an arrangement of separate physical components, such as respective cameras mounted on opposite sides of the vehicle. Other examples are possible. Thus, the functional blocks of FIG. 1 are illustrated as shown only for convenience in description. Other example components, arrangements, and/or configurations are possible as well without departing from the scope of the present disclosure.

Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted, etc.) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 116. In another embodiment, one or more functions of controller 104 can be alternatively performed by one or more physically separate controllers that are each disposed within a respective component (e.g., sensor(s) 106, 108, etc.) of system 100.

In some examples, controller 104 may include or otherwise be coupled to wiring used for transfer of control signals to various components of system 100 and/or for transfer of data from various components of system 100 to controller 104. Generally, the data that controller 104 receives may include sensor data based on detections of light by LIDAR 106 and/or cameras 108, among other possibilities. Moreover, the control signals sent by controller 104 may operate various components of system 100, such as by controlling emission and/or detection of light or other signal by sensor(s) 106 (e.g., LIDAR, etc.), controlling image pixel capture rate or times via a camera (e.g., included in sensors 108), and/or controlling actuator(s) 112 to rotate rotating platform 110, among other possibilities.

To that end, in some examples, controller 104 may include one or more processors, data storage, and program instructions (stored in the data storage) executable by the one or more processors to cause system 100 to perform the various operations described herein. In some instances, controller 104 may communicate with an external controller or the like (e.g., a computing system arranged in a vehicle, robot, or other mechanical device to which system 100 is mounted) so as to help facilitate transfer of control signals and/or data between the external controller and the various components of system 100.

Additionally or alternatively, in some examples, controller 104 may include circuitry wired to perform the various functions described herein. Additionally or alternatively, in some examples, controller 104 may include one or more special purpose processors, servos, or other types of controllers. For example, controller 104 may include a proportional-integral-derivative (PID) controller or other control loop feedback apparatus that operates actuator(s) 112 to modulate rotation of rotating platform 110 according to a particular frequency or phase. Other examples are possible as well.

Sensors 106 and 108 can optionally include one or more sensors, such as LIDARs, cameras, gyroscopes, accelerometers, encoders, microphones, RADARs, SONARs, thermometers, etc., that scan a surrounding environment of system 100.

Sensor(s) 106 may include any device configured to scan a surrounding environment by emitting a signal and detecting reflections of the emitted signal. For instance, sensor(s) 106 may include any type of active sensor. To that end, as shown, sensor 106 includes a transmitter 120 and a receiver 122. In some implementations, sensor 106 may also include one or more optical elements 124.

Transmitter 120 may be configured to transmit a signal toward an environment of system 100.

In a first example, where sensor 106 is configured as a LIDAR sensor, transmitter 120 may include one or more light sources (not shown) that emit one or more light beams and/or pulses having wavelengths within a wavelength range. The wavelength range could, for example, be in the ultraviolet, visible, and/or infrared portions of the electromagnetic spectrum depending on the configuration of the light sources. In some examples, the wavelength range can be a narrow wavelength range, such as provided by lasers and/or some light emitting diodes. In some examples, the light source(s) in transmitter 120 may include laser diodes, diode bars, light emitting diodes (LEDs), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), fiber lasers, and/or any other device configured to selectively transmit, reflect, and/or emit light to provide a plurality of emitted light beams and/or pulses.

In a second example, where sensor 106 is configured as an active infrared (IR) camera, transmitter 120 may be configured to emit IR radiation to illuminate a scene. To that end, transmitter 120 may include any type of device (e.g., light source, etc.) configured to provide the IR radiation.

In a third example, where sensor 106 is configured as a RADAR sensor, transmitter 120 may include one or more antennas configured to emit a modulated radio-frequency (RF) signal toward an environment of system 100.

In a fourth example, where sensor 106 is configured as a SONAR sensor, transmitter 120 may include one or more acoustic transducers, such as piezoelectric transducers, magnetostrictive transducers, electrostatic transducers, etc., configured to emit a modulated sound signal toward an environment of system 100. In some implementations, the acoustic transducers can be configured to emit sound signals within a particular wavelength range (e.g., infrasonic, ultrasonic, etc.). Other examples are possible as well.

Receiver 122 may include one or more detectors configured to detect reflections of the signal emitted by transmitter 120.

In a first example, where sensor 106 is configured as a RADAR sensor, receiver 122 may include one or more antennas configured to detect reflections of the RF signal transmitted by transmitter 120. To that end, in some implementations, the one or more antennas of transmitter 120 and receiver 122 can be physically implemented as the same physical antenna structures.

In a second example, where sensor 106 is configured as a SONAR sensor, receiver 122 may include one or more sound sensors (e.g., microphones, etc.) that are configured to detect reflections of the sound signals emitted by transmitter 120.

In a third example, where sensor 106 is configured as an active IR camera, receiver 122 may include one or more light detectors (e.g., active pixel sensors, etc.) that are configured to detect a source wavelength of IR light transmitted by transmitter 120 and reflected off a scene toward receiver 122.

In a fourth example, where sensor 106 is configured as a LIDAR sensor, receiver 122 may include one or more light detectors (e.g., photodiodes, avalanche photodiodes, etc.) that are arranged to intercept and detect reflections of the light pulses emitted by transmitter 120 and reflected from one or more objects in a surrounding environment of system 100. To that end, receiver 122 may be configured to detect light having wavelengths in the same wavelength range as the light emitted by transmitter 120. In this way, for instance, sensor 106 (e.g., LIDAR) may distinguish reflected light pulses originated by transmitter 120 from other light originating from external light sources in the environment.

In some instances, receiver 122 may include a photodetector array, which may include one or more detectors each configured to convert detected light (e.g., in the wavelength range of light emitted by transmitter 120) into an electrical signal indicative of the detected light. In practice, such a photodetector array could be arranged in one of various ways. For instance, the detectors can be disposed on one or more substrates (e.g., printed circuit boards (PCBs), flexible PCBs, etc.) and arranged to detect incoming light. Also, such a photodetector array could include any feasible number of detectors aligned in any feasible manner. Additionally, the detectors in the array may take various forms. For example, the detectors may take the form of photodiodes, avalanche photodiodes (e.g., Geiger mode and/or linear mode avalanche photodiodes), silicon photomultipliers (SiPMs), phototransistors, cameras, active pixel sensors (APS), charge coupled devices (CCD), cryogenic detectors, and/or any other sensor of light configured to receive focused light having wavelengths in the wavelength range of the emitted light.

In some implementations, sensor 106 (e.g., in a LIDAR configuration) can select or adjust a horizontal scanning resolution by changing a rate of rotation of the LIDAR and/or adjusting a pulse rate of light pulses emitted by transmitter 120. As a specific example, transmitter 120 can be configured to emit light pulses at a pulse rate of 15,650 light pulses per second. In this example, LIDAR 106 may be configured to rotate at 10 Hz (i.e., ten complete 3600 rotations per second). As such, receiver 122 can detect light with a 0.23° horizontal angular resolution. Further, the horizontal angular resolution of 0.23° can be adjusted by changing the rate of rotation of LIDAR 106 or by adjusting the pulse rate. For instance, if LIDAR 106 is instead rotated at 20 Hz, the horizontal angular resolution may become 0.46°. Alternatively, if transmitter 120 emits the light pulses at a rate of 31,300 light pulses per second while maintaining the rate of rotation of 10 Hz, then the horizontal angular resolution may become 0.115°. Other examples are possible as well. Further, in some examples, LIDAR 106 can be alternatively configured to scan a particular range of views within less than a complete 360° rotation of LIDAR 106.

Optical element(s) 124 can be optionally included in or otherwise coupled to transmitter 120 and/or receiver 122. In one example (e.g., where sensor 106 includes a LIDAR sensor), optical element(s) 124 can be arranged to direct light from a light source in transmitter 120 toward the environment. In another example, optical element(s) 124 can be arranged to focus and/or guide light from the environment toward receiver 122. As such, optical element(s) 124 may include any feasible combination of mirror(s), waveguide(s), light filters, lens(es), or any other optical components arranged to guide propagation of light through physical space and/or adjust certain light characteristics. For instance, optical elements 124 may include a light filter arranged to reduce or prevent light having wavelengths outside the wavelength range of the light emitted by transmitter 120 from propagating toward receiver 122. With such arrangement for instance, the light filter can reduce noise due to background light propagating from the scanned environment and originating from an external light source different than light sources of transmitter 120.

Stereo sensors 108 may include any type of stereo sensor system configured to scan the surrounding environment. As shown, stereo sensors 108 include a first image sensor 128 and a second image sensor 130.

In some examples, stereo sensors 108 may include active sensors (e.g., infrared cameras) that transmit signals and detect reflections thereof. Thus, although not shown, sensors 108 may include a transmitter and a receiver that are similar to, respectively, transmitter 120 and receiver 122. In other examples, stereo sensors 108 may include passive sensors (e.g., cameras, image sensors, etc.) that detect external signals originating from one or more external sources.

In a first example, where stereo sensors 108 are configured as two or more cameras, the cameras may include any camera (e.g., a still camera, a video camera, etc.) configured to capture images of the environment in which system 100 is located. For example, a camera of stereo sensors 108 may include any imaging device that detects and provides data indicative of an image. For instance, the first and second image sensors 128, 130 may each include one or more arrangements of light sensing elements that each provide a measure of light incident thereon. To that end, first and second image sensors 128, 130 may each include charge-coupled devices (CCDs), active pixel sensors, complementary metal-oxide-semiconductor (CMOS) photodetectors, N-type metal-oxide-semiconductor (NMOS) photodetectors, among other possibilities.

In some examples, an image sensor can optionally include multiple adjacent light detectors (or detectors of other types of signals), where each detector is configured to detect light (or other signal) having a particular wavelength or wavelength range. For instance, an image pixel may indicate color information (e.g., red-green-blue or RGB) based on a combination of data from a first detector that detects an intensity of red light, a second detector that detects an intensity of green light, and a third detector that detects an intensity of blue light. Other examples are possible as well.

In one embodiment, stereo sensors 108 may be configured to detect visible light propagating from the scene. Further, in this embodiment, receiver 122 of sensor 106 (e.g., LIDAR receiver) may be configured to detect invisible light (e.g., infrared, etc.) within a wavelength range of light emitted by transmitter 120. In this embodiment, system 100 (or controller 104) can then combine data from sensor 106 (e.g., LIDAR) with data from sensor 108 (e.g., camera) to generate a colored three-dimensional (3D) representation (e.g., point cloud) of the scanned environment.

In some examples, sensor(s) 108 may be configured to operate in a rolling shutter mode.

Rotating platform 110 may be configured to rotate about an axis. For example, sensor 106 (and/or transmitter 120 and receiver 122 thereof) may be supported (directly or indirectly) by rotating platform 110 such that each of these components moves relative to the environment in response to rotation of rotating platform 110. In particular, each of these components could be rotated (simultaneously) relative to an axis so that sensor 106 may obtain information from various directions. In some examples, the axis of rotation of rotating platform 110 is vertical and a pointing direction of sensor 106 can be adjusted horizontally by the rotation of rotating platform 110 about its vertical axis of rotation. Rotating platform 110 can be formed from any solid material suitable for supporting one or more components (e.g., sensor 106) mounted thereon.

In order to rotate platform 110 in this manner, one or more actuators 112 may actuate rotating platform 110. To that end, actuators 112 may include motors, pneumatic actuators, hydraulic pistons, and/or piezoelectric actuators, among other possibilities.

With this arrangement, controller 104 could operate actuator 112 to rotate rotating platform 110 in various ways so as to obtain information about the environment. In one example, rotating platform 110 could be rotated in either direction. In another example, rotating platform 110 may carry out complete revolutions such that sensor 106 (e.g., LIDAR) provides a 360° horizontal FOV of the environment. Moreover, rotating platform 110 may rotate at various frequencies so as to cause sensor 106 to scan the environment at various refresh rates and/or scanning resolutions.

Alternatively or additionally, system 100 may be configured to adjust the pointing direction of the emitted signal (emitted by transmitter 120) in various ways. In some examples, signal sources (e.g., light sources, antennas, acoustic transducers, etc.) of transmitter 120 can be operated according to a phased array configuration or other type of beam steering configuration.

In a first example, where sensor 106 is configured as a LIDAR sensor, light sources in transmitter 120 can be coupled to phased array optics (e.g., optical elements 124) that control the phase of light waves emitted by the light sources. For instance, controller 104 can be configured to adjust the phased array optics (e.g., phased array beam steering) to change the effective pointing direction of a light signal emitted by transmitter 120 (e.g., even if rotating platform 110 is not rotating).

In a second example, where sensor 106 is configured as a RADAR sensor, transmitter 120 may include an array of antennas, and controller 104 can provide respective phase-shifted control signals for each individual antenna in the array to modify a pointing direction of a combined RF signal from the array (e.g., phased array beam steering).

In a third example, where sensor 106 is configured as a SONAR sensor, transmitter 120 may include an array of acoustic transducers, and controller 104 can similarly operate the array of acoustic transducers (e.g., via phase-shifted control signals, etc.) to achieve a target pointing direction of a combined sound signal emitted by the array (e.g., even if the rotating platform 110 is not rotating, etc.).

In other examples, the pointing direction of sensor(s) 106 can be controlled using a deforming flexible structure (e.g., MEMs, etc.) that can be deformed in response to a control signal from controller 104 to adjust a steering direction of the signals emitted by transmitter 120. Other examples are possible.

Rotary link 116 directly or indirectly couples the rotating platform 110 to the vehicle. To that end, rotary link 116 may take on any shape, form and material that provides for rotation of rotating platform 110 about an axis relative to the vehicle. In some examples, rotary link 116 may take the form of a shaft or the like that rotates based on actuation from actuator 112, thereby transferring mechanical forces from actuator 112 to rotating platform 110. In one implementation, rotary link 116 may have a central cavity in which one or more components of system 100 may be disposed. In some examples, rotary link 116 may also provide a communication link for transferring data and/or instructions between stationary platform 114 and the vehicle (and/or components thereon such as sensor(s) 106, etc.).

Stationary platform(s) 114 may take on any shape or form and may be configured for coupling to various structures, such as to a side mirror of a vehicle for example. Also, the coupling of stationary platform 114 may be carried out via any feasible connector arrangement (e.g., bolts and/or screws). In this way, system 100 could be coupled to a structure so as to be used for various purposes, such as those described herein. In one example, stereo sensors 108 can be coupled to respective stationary platforms 114. In this example, stereo sensors 108 can remain stationary relative to the rotational motion of sensor(s) 106 (or the otherwise changing beam directions of signals emitted by transmitter 120). In another example, stereo sensors 108 can be mounted to another physical structure different than stationary platform 114.

Housing 118 may take on any shape, form, and material and may be configured to house one or more components of system 100. In one example, housing 118 can be a dome-shaped housing. Further, in some examples, housing 118 may be composed of a material that is at least partially non-transparent, which may allow for blocking of at least some light from entering the interior space of housing 118 and thus help mitigate thermal and noise effects of ambient light on one or more components of system 100. Other configurations of housing 118 are possible as well. In some implementations, housing 118 may be coupled to rotating platform 110 such that housing 118 is configured to rotate about the above-mentioned axis based on rotation of rotating platform 110. In such implementations, sensor(s) 106 may rotate together with housing 118. In other implementations, housing 118 may remain stationary while sensor(s) 106 rotate within housing 118. System 100 could also include multiple housings similar to housing 118 for housing certain sub-systems or combinations of components of system 100. For example, system 100 may include a first housing for sensor(s) 106 and a separate housing for stereo sensors 108. Other examples are possible as well.

Display 140 can optionally be included in system 100 to display information about one or more components of system 100. For example, controller 104 may operate display 140 to display images captured using a camera (e.g., sensor 108), a representation (e.g., 3D point cloud, etc.) of an environment of system 100 indicated by LIDAR data from sensor 106, and/or a representation of the environment based on a combination of the data from sensors 106 and 108 (e.g., colored point cloud, images with superimposed temperature indicators, etc.). To that end, display 140 may include any type of display (e.g., liquid crystal display, LED display, cathode ray tube display, projector, etc.). Further, in some examples, display 140 may have a graphical user interface (GUI) for displaying and/or interacting with images captured by sensor 108, LIDAR data captured using sensor 106, and/or any other information about the various components of system 100 (e.g., power remaining via power supply arrangement 102). For example, a user can manipulate the GUI to adjust a scanning configuration of sensors 106 and/or 108 (e.g., scanning refresh rate, scanning resolution, etc.).

It is noted that the various components of system 100 can be combined or separated into a wide variety of different arrangements. For example, although sensors 106 and 108 are illustrated as separate components, one or more components of sensors 106 and 108 can alternatively be physically implemented within a single device. Thus, this arrangement of system 100 is described for exemplary purposes only and is not meant to be limiting.

Figure 2:
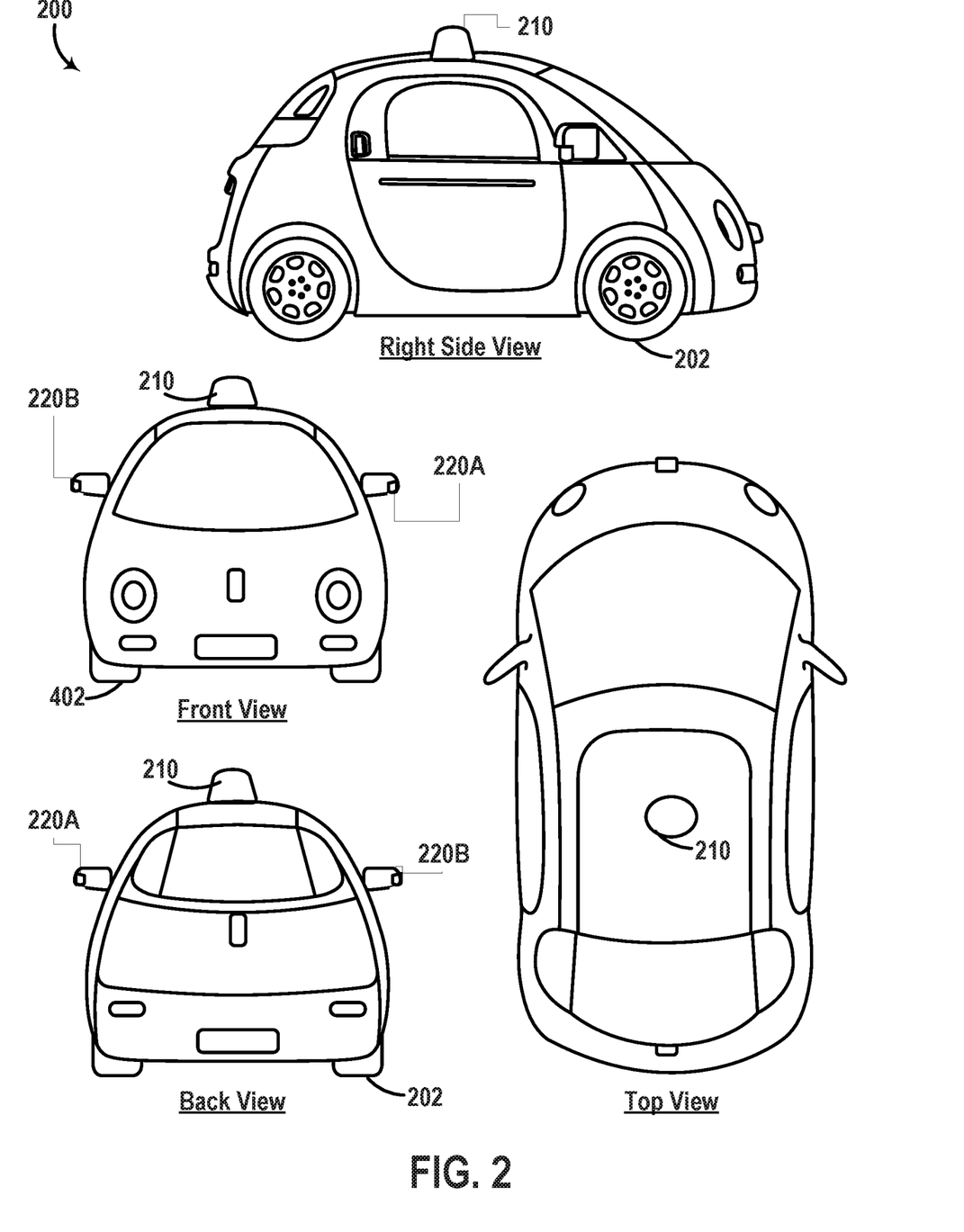
FIG. 2 illustrates several views of a vehicle equipped with a sensor system, according to an example embodiment.

FIG. 2 illustrates a Right Side View, Front View, Back View, and Top View of a vehicle 200 equipped with an active sensor module 210 and a stereo image sensor system consisting of two image sensors 220A, 220B, according to example embodiments. The active sensor module may be similar to the sensor(s) 106 described above. Similarly, the stereo image sensor system may be similar to the stereo sensors 108 described above. Although vehicle 200 is illustrated as a car, other types of vehicles are possible. Furthermore, although vehicle 200 may be configured to operate in autonomous mode, the embodiments described herein are also applicable to vehicles that are not configured to operate autonomously.

As shown, the vehicle 200 includes an active sensor module 210 mounted on a top side of vehicle 200 opposite a bottom side on which wheels of vehicle 200, exemplified by wheel 202, are located. Although the active sensor module 210 is shown and described as being positioned on a top side of vehicle 200, active sensor module 210 could be alternatively positioned on any other part of vehicle 200, including any other side of vehicle 200 for instance.

The vehicle 200 as shown includes only a single active sensor module 210. However, the vehicle 200 could include a plurality of active sensor module 210. The use of multiple active sensor module 210 can be used to scan different regions of the environment around the vehicle 200 at different rates and/or different resolutions. Alternatively or additionally, the active sensor module 210 can include multiple active sensors for this same purpose.

The first and second image sensors 220A, 220B are mounted on respective side mirrors of the vehicle 200. Although the first and second image sensors 220A, 220B are shown and described as being positioned on the respective side mirrors of the vehicle 200, the first and second image sensors 220A, 220B could be alternatively positioned on any other part of vehicle 200, including any other side of vehicle 200 for instance. Additionally, although the first and second image sensors 220A, 220B are shown as being separately mounted to the vehicle 200, the first and second image sensors 220A, 220B could alternatively be mounted together as a single image sensor array.

The vehicle 200 may also include additional types of sensors mounted on the exterior thereof, such as the temperature sensor, sound sensor, LIDAR sensor, RADAR sensor, SONAR sensor, and/or cameras described above.

In operation, the active sensor module 210 scans the environment around the vehicle 200. Data from the active sensor module 210 is used to form a 3D representation of the environment, such as a point cloud. Substantially simultaneously, the first and second image sensors 220A, 220B are used to take respective images of a field-of-view at least partially containing at least part of the environment scanned by the active sensor module 210. The respective images can be combined with each other to form a 3D representation of the field-of-view. In some examples, the images are combined with the data from the active sensor module 210 to form a more detailed 3D representation of the environment. In some forms, the 3D representation is further supplemented by data from the LIDAR sensor, RADAR sensor, SONAR sensor, and/or cameras described above.

Figure 3:
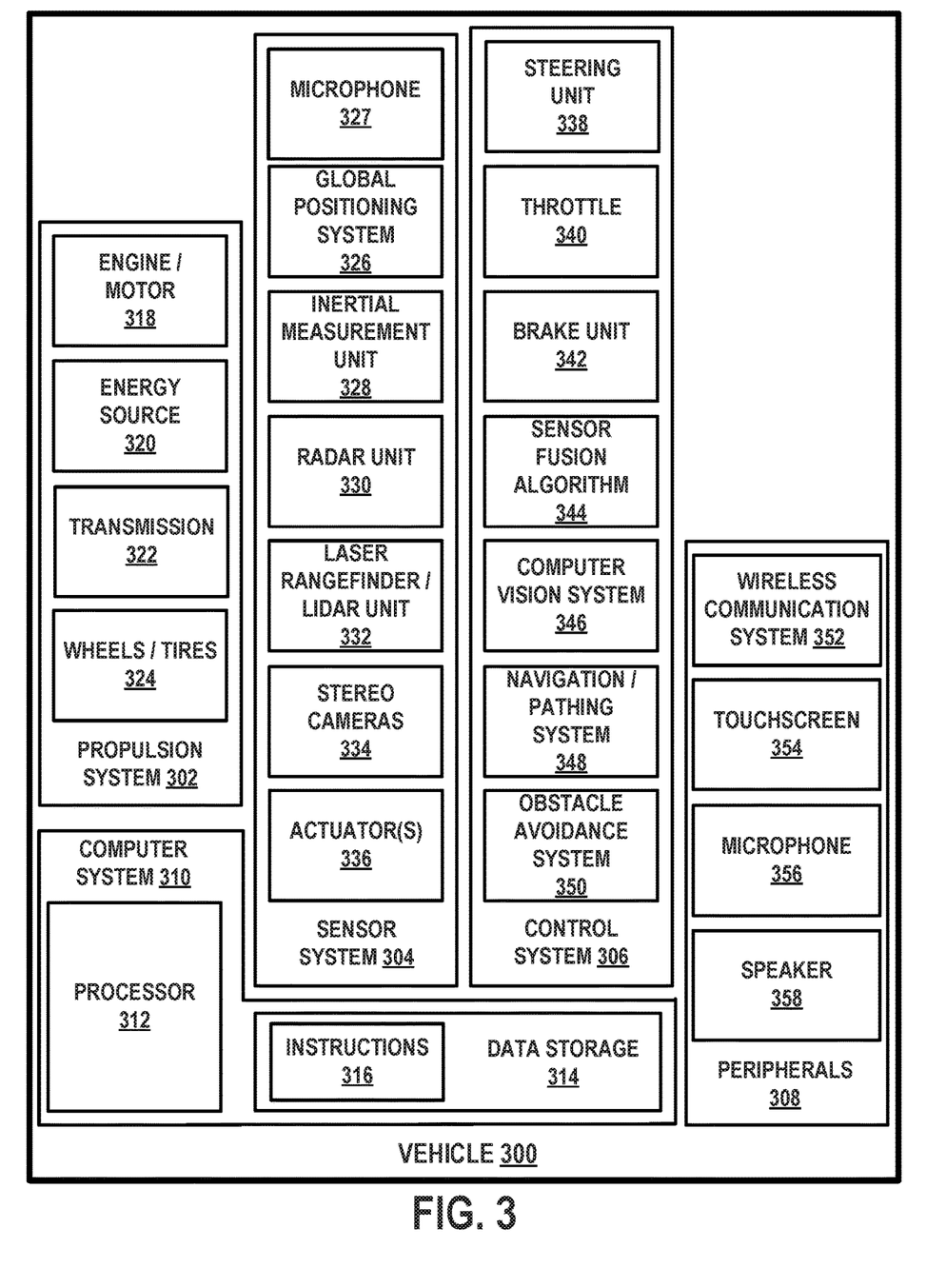
FIG. 3 is a simplified block diagram of a vehicle, according to example embodiments.

FIG. 3 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. The sensor system 304 may be similar to the sensor system 100 described above. As shown, sensor system 304 includes a microphone 327, a Global Positioning System (GPS) 326, an inertial measurement unit (IMU) 328, a RADAR unit 330, a laser rangefinder and/or LIDAR unit 332, and a stereo camera system 334. Sensor system 304 may include additional sensors as well, including, for example, sensors that monitor internal systems of the vehicle 300 (e.g., an O2 monitor, a fuel gauge, an engine oil temperature, etc.). Other sensors are possible as well.

The microphone module 327 may be any sensor (e.g., acoustic sensor) configured to detect and record sounds originating outside of the vehicle 300.

GPS 326 may be any sensor (e.g., location sensor) configured to estimate a geographic location of vehicle 300. To this end, the GPS 326 may include a transceiver configured to estimate a position of the vehicle 300 with respect to the Earth.

IMU 328 may be any combination of sensors configured to sense position and orientation changes of the vehicle 300 based on inertial acceleration. In some embodiments, the combination of sensors may include, for example, accelerometers, gyroscopes, compasses, etc.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser range finder or LIDAR unit 332 may be any sensor configured to sense objects in the environment in which vehicle 300 is located using lasers. For example, LIDAR unit 332 may include one or more LIDAR devices, at least some of which may take the form of devices 100 and/or 200 among other LIDAR device configurations, for instance.

The stereo cameras 334 may be any cameras (e.g., a still camera, a video camera, etc.) configured to capture images of the environment in which the vehicle 300 is located. To that end, the stereo cameras 334 may take any of the forms described above.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The sensor fusion algorithm 344 is operated on a processor, such as the external processor discussed above. The data may include, for example, data representing information sensed by sensor system 304. Sensor fusion algorithm 344 may include, for example, a Kalman filter, a Bayesian network, a machine learning algorithm, an algorithm for some of the functions of the methods herein, or any other sensor fusion algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by stereo cameras 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, microphone 327, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may comprise one or more general-purpose processors and/or one or more special-purpose processors. To the extent that processor 312 includes more than one processor, such processors could work separately or in combination.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308. In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

Figure 4:
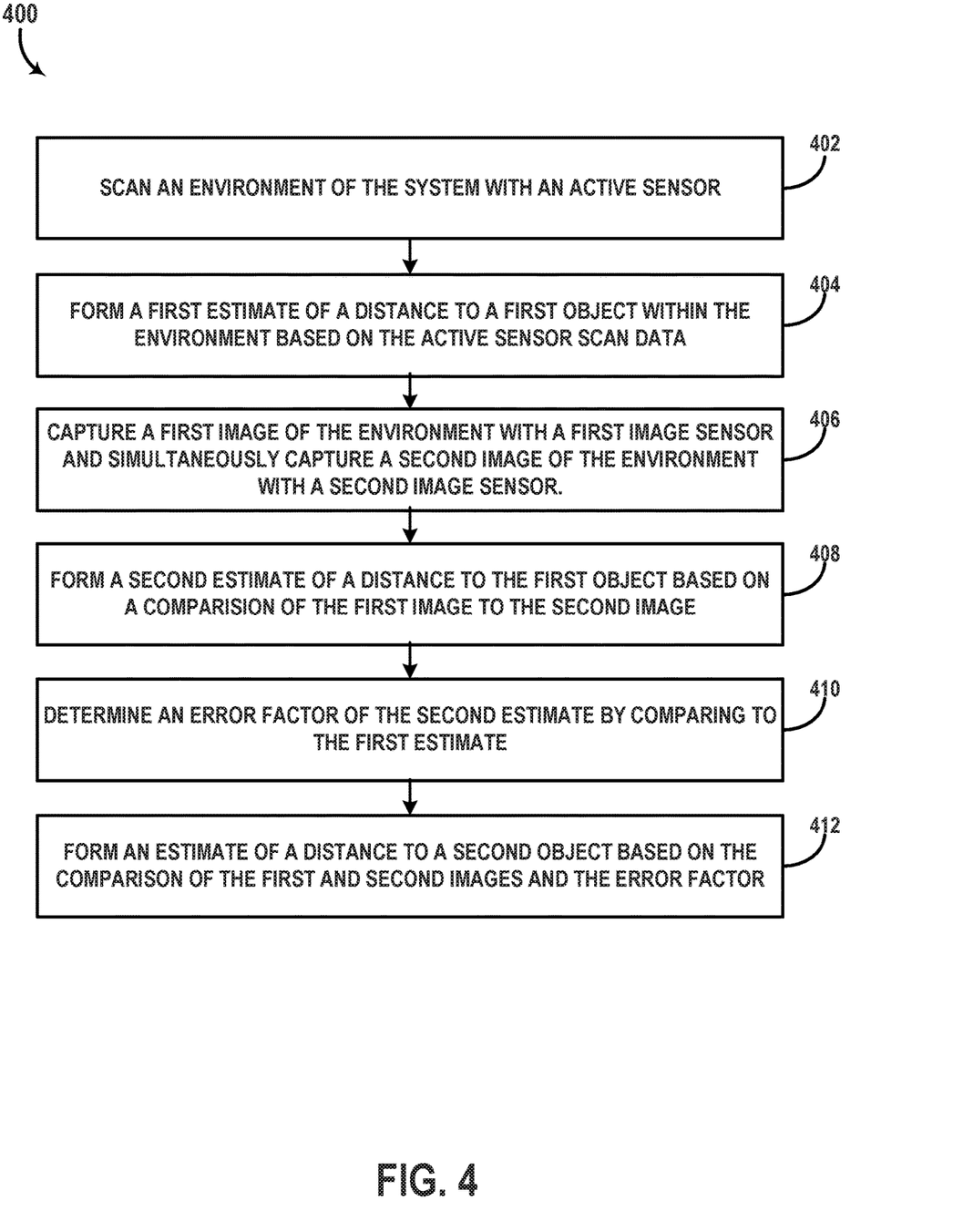
FIG. 4 is a flowchart of a method, according to example embodiments.

FIG. 4 is a flowchart of a method 400, according to example embodiments. Method 400 presents an embodiment of a method that could be used with any of system 100, vehicle 200, and/or vehicle 300, for example. Method 400 may include one or more operations, functions, or actions as illustrated by one or more of blocks 402-412. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. The method 400 is a method of estimating distance to objects. More specifically, the method 400 is a method of improving the accuracy of distance estimates based on a stereo image sensor system using data from an active sensor.

In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 400 and other processes and methods disclosed herein, each block in FIG. 4 may represent circuitry that is wired to perform the specific logical functions in the process.

At block 402, method 400 involves scanning the environment around the system with an active sensor. In some examples, scanning the environment includes rotating a LIDAR sensor about an axis to scan an environment of the LIDAR sensor. For example, the LIDAR sensor may be mounted on rotating platform that rotates about axis to adjust a pointing direction of LIDAR sensor. Further, while rotating, LIDAR sensor may emit one or more light beams or pulses toward a field-of-view of the environment defined by the pointing direction of LIDAR, and then detect reflections of the emitted light.

At block 404, method 400 involves forming a first estimate of a distance to a first object within the environment based on the active sensor scan data. For example, the time between transmitting a signal while the active sensor is pointed at the first object and receiving the reflected signal off of the object can be used to calculate the distance to the object if the speed of the signal is known (e.g., the speed of light). In some examples, the first object is identified as having one or more factors resulting in accurate detection and ranging by the active sensor. For example, the estimated distance to the first object is within the operational range of the active sensor (such as within 150 meters of an active sensor including a medium range LIDAR device). Alternatively or additionally, the first object has one or more reflective surfaces substantially normal or orthogonal to the pointing direction of the active sensor. In some forms, the first object is a sign, such as a traffic sign. The controller identifies one or more objects within the scan data having one or more of these factors to use in the method 400.

At block 406, method 400 involves capturing a first image of the environment with a first image sensor and capturing a second image of the environment with a second image sensor. For example, two images of the environment are captured simultaneously by two cameras in a stereo camera system. The two image sensors have overlapping fields-of-view, such that both images include the first object.

At block 408, method 400 involves comparing the first image and the second image to form a second distance estimate to the first object. The method of estimating distance using a stereo camera system is described in greater detail below.

At block 410, method 400 involves comparing the first estimate to the second estimate in order to determine an error factor of the second estimate. In one example, the first estimate is divided by the second estimate to calculate the error factor.

In other examples, steps 404 and 408 include estimating distances to multiple respective first objects. Step 410 then includes calculating a more complex error factor based on the comparison of multiple estimates. For example, the error factor may vary based on the distance of the object to the system.

At block 412, method 400 involves forming a distance estimate to a second object based on the comparison of the first and second images and the error factor. In one example, an initial estimate is formed by comparing the first image to the second image in the same manner as step 408 and described below. The initial estimate is then modified by the error factor, such as by multiplying the initial estimate by the error factor, to form the final distance estimate.

Figure 5:
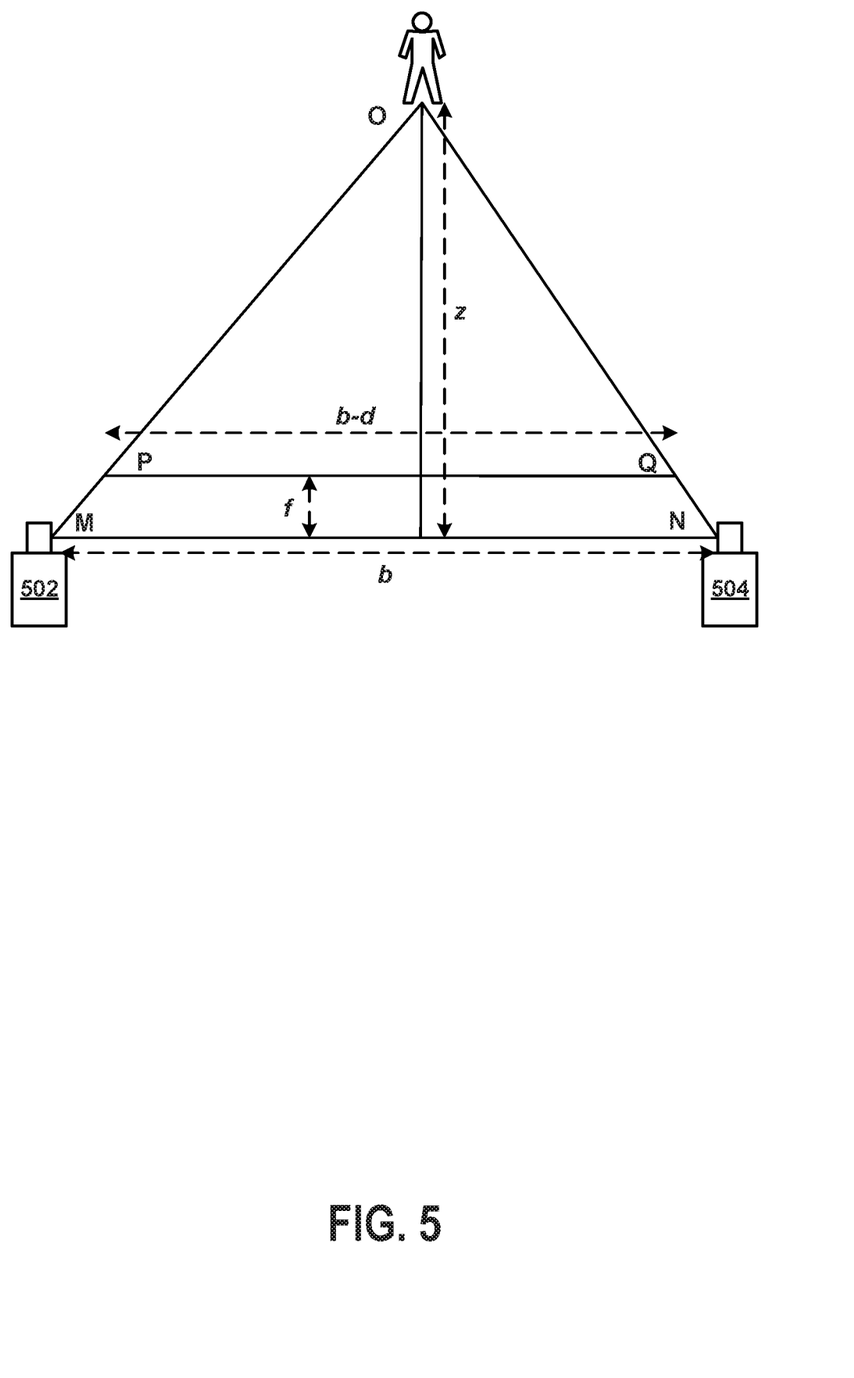
FIG. 5 depicts determining the distance between an object and two cameras, according to example embodiments.

Triangulation based on the locations of two image capture components, such as the two image sensors in the stereo image sensor systems described above, and an object in a scene can be used to estimate the distance from the image capture components to the object. Turning to FIG. 5, left camera 502 and right camera 504 are assumed to be a distance of b apart from one another on the x-axis. One or both of these cameras has a focal length of f (the position and magnitude of which are exaggerated in FIG. 5 for purpose of illustration). Both cameras are also aimed at an object that is a distance z from the cameras on the z-axis. The values of b and f are known, but the value of z is to be estimated.

One way of doing so is to capture images of the object at both left camera 502 and right camera 504. The object will appear slightly to the right in the image captured by left camera 502 and slightly to the left in the image captured by right camera 504. This x-axis distance between the object as it appears in the captured images is the disparity, d.

A first triangle, MNO, can be drawn between left camera 502, right camera 504, and the object. Also, a second triangle, PQO, can be drawn from point P (where the object appears in the image captured by left camera 502) to point Q (where the object appears in the image captured by right camera 504), to point O. The disparity, d, also can be expressed as the distance between point P and point Q.

Formally, triangle MNO and triangle PQO are similar triangles, in that all of their corresponding angles have the same measure. As a consequence, they also have the same ratio of width to height. Therefore:

$$\frac{b}{z} = \frac{b-d}{z-f} \qquad 1)$$

$$b(z-f) = z(b-d) \qquad 2)$$

$$bz - bf = bz - dz \qquad 3)$$

$$-bf = -dz \qquad 4)$$

$$z = \frac{bf}{d} \qquad 5)$$

In this manner, the distance z from the cameras to the object can be directly estimated.

In operation, increasing the distance b between the cameras 502, 504 increases the disparity d. Accordingly, a stereo image sensor system is able to more accurately calculate the distance to an object, and calculate the distance to further away objects, if the distance b between the cameras 502, 504 is greater. To this end, in some example two image sensors are located on opposite sides of a vehicle. For example, two images are mounted on opposite side mirrors of the vehicle as shown above.

As described above, triangulating the distance to an object based on images from a stereo image sensor system uses the distance b between the two cameras. In operation, the distance b between the two cameras can be programmed or entered into the system by the installer or manufacturer based on the distance between where the two cameras are mounted. While the vehicle is in an undeformed state, the distance b remains constant. However, during operation a number of forces are exerted on a vehicle, causing the vehicle to undergo deformations. These deformations can change the distance between the two cameras, such that the programmed distance b is inaccurate. These deformations can be a cause of the error being accounted for by the error factor determined above. Because the amount of deformation of the vehicle can change rapidly, the distance estimates formed based on active sensor data are formed from active sensor data received substantially simultaneously to when the images were captured.

Figure 6:
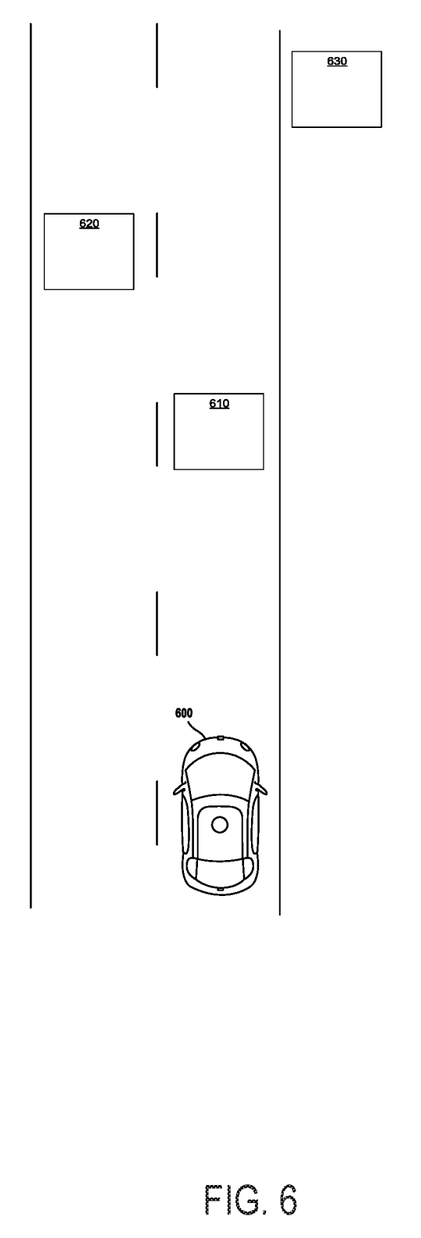
FIG. 6 illustrates a vehicle equipped with a sensor system according to an example embodiment within an environment containing a plurality of objects.

FIG. 6 illustrates a vehicle 600 according to an example embodiment. The vehicle 600 is substantially similar to the vehicle 200 or vehicle 300 described above. As described above, the vehicle 600 includes an active sensor and a stereo image sensor system.

The environment around the vehicle 600 includes a plurality of objects 610, 620, 630. In operation, the vehicle 600 performs the method 400 to estimate the distance from the vehicle 600 to the objects 610, 620, 630.

In one example, the distance to the first object 610 is estimated based on data from the active sensor. The distance to the first object 610 is separately estimated based on data from the stereo image sensor system. The two estimates are compared to determine an error factor indicating a difference between the first estimate and the second estimate. The distance to the second object 620 is estimated based on data from the stereo image sensor system and the error factor.

In a second example, the distance to the first object 610 is estimated based on data from the active sensor. The distance to the first object 610 is separately estimated based on data from the stereo image sensor system. The two estimates are compared to determine the amount of error in the stereo image sensor system estimate. Similarly, the distance to the second object 620 is estimated based on data from the active sensor. The distance to the second object 620 is separately estimated based on data from the stereo image sensor system. The two estimates are compared to determine the amount of error in the stereo image sensor system estimate. The distance to the third object 630 is estimated by extrapolating the two calculated error amounts to determine an error factor and modifying an initial estimate based on data from the stereo image sensor system with the error factor.

In a third example, the distance to the first object 610 is estimated based on data from the active sensor. The distance to the first object 610 is separately estimated based on data from the stereo image sensor system. The two estimates are compared to determine the amount of error in the stereo image sensor system estimate. Similarly, the distance to the third object 630 is estimated based on data from the active sensor. The distance to the third object 630 is separately estimated based on data from the stereo image sensor system. The two estimates are compared to determine the amount of error in the stereo image sensor system estimate. The distance to the second object 620 is estimated by interpolating the two calculated error amounts to determine an error factor and modifying an initial estimate based on data from the stereo image sensor system with the error factor.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed:

1. A system comprising:
an active sensor that includes a transmitter and a receiver, wherein the transmitter emits a signal toward an environment of the active sensor, wherein the receiver detects reflections of the emitted signal, and wherein the active sensor has a maximum operational range;
a first camera that detects external light originating from one or more external light sources to generate first image data;
a second camera that detects external light originating from one or more external light sources to generate second image data; and
a controller configured to perform operations comprising:
determining a first distance estimate to a first object based on a comparison of the first image data and the second image data;
determining a second distance estimate to the first object based on active sensor data;
comparing the first distance estimate and the second distance estimate; and
determining a third distance estimate to a second object based on the first image data, the second image data, and the comparison of the first and second distance estimates, wherein the third distance estimate is greater than the maximum operational range of the active sensor.

2. The system of claim 1 wherein the active sensor scans the environment based on rotation of the active sensor about an axis.

3. The system of claim 1 wherein the first object has a first surface substantially orthogonal to a pointing direction of the transmitter.

4. The system of claim 1 wherein the first object is a sign.

5. The system of claim 1 wherein a distance to the second object is greater than a distance to the first object.

6. The system of claim 1 wherein the active sensor is one of a LIDAR sensor, a SONAR sensor, or a RADAR sensor.

7. The system of claim 1 wherein the controller is configured to perform operations further comprising:
determining a fourth distance estimate to a third object based on a comparison of the first image data and the second image data;
determining a fifth distance estimate to the third object based on active sensor data; and
comparing the fourth distance estimate and the fifth distance estimate.

8. The system of claim 7 wherein determining the third distance estimate to the second object is additionally based on the comparison of the fourth and fifth distance estimates.

9. A method comprising:
scanning an environment around a system with an active sensor, wherein the active sensor has a maximum operational range;
forming a first estimate of a distance between the system and a first object based on scan data from the active sensor;
capturing a first image of the environment with a first image sensor;
capturing a second image of the environment with a second image sensor;
forming a second estimate of the distance between the system and the first object based on the first image and the second image;
determining an error factor of the second estimate by comparing the second estimate to the first estimate; and
forming a third estimate of a distance between the system and a second object based on the first image, the second image, and the error factor, wherein the third estimate of the distance is greater than the maximum operational range of the active sensor.

10. The method of claim 9 scanning the environment includes rotating the active sensor.

11. The method of claim 9 wherein scanning the environment includes emitting light from the active sensor and receiving reflected light at the active sensor.

12. The method of claim 9 wherein determining the error factor includes dividing the first estimate by the second estimate.

13. The method of claim 9 wherein forming the estimate of the distance between the system and the second object includes forming an initial estimate based on the first image and the second image and multiplying the initial estimate by the error factor.

14. The method of claim 9 wherein forming the second estimate of the distance between the system and the first object includes determining a disparity between a location of the first object in the first image and a location of the first object in the second image.

15. The method of claim 14 wherein forming the second estimate further includes triangulating the distance between the system and the first object based on the disparity and a stored distance between the first image sensor and the second image sensor.

16. The method of claim 9 wherein the active sensor is one of a LIDAR sensor, a SONAR sensor, or a RADAR sensor.

17. A vehicle comprising:
a light detection and ranging (LIDAR) sensor that includes a transmitter and a receiver, wherein the transmitter emits light pulses toward an environment of the LIDAR sensor, wherein the receiver detects reflections of the emitted light pulses, and wherein the LIDAR sensor has a maximum operational range;
a stereo image sensor system comprising a first image sensor and a second image sensor; and
a controller configured to perform operations comprising:
determining a first distance estimate to a first object based on data from the stereo image sensor system;
determining a second distance estimate to the first object based on data from the LIDAR sensor;
determining an error factor by comparing the first distance estimate and the second distance estimate; and
determining a third distance estimate to a second object based on data from the stereo image sensor system and the error factor, wherein the third distance estimate is greater than the maximum operational range of the LIDAR sensor.

18. The vehicle of claim 17 further comprising a body, wherein the LIDAR sensor is mounted to a top surface of the body.

19. The vehicle of claim 18 further comprising a first side mirror mounted on a first side of the body and a second side mirror mounted on a second side of the body, the second side being opposite the first side,
wherein the first image sensor is mounted to the first side mirror and the second image sensor is mounted to the second side mirror.

20. The vehicle of claim 17 is configured to perform operations further comprising:

forming a 3D representation of the environment based on at least one of the LIDAR sensor data or the data from the stereo image sensor system.

\* \* \* \* \*